United States Patent
Ma et al.

(10) Patent No.: US 10,928,663 B2
(45) Date of Patent: Feb. 23, 2021

(54) BACKLIGHT MODULE AND DISPLAY DEVICE

(71) Applicant: BOE TECHNOLOGY GROUP CO., LTD., Beijing (CN)

(72) Inventors: Yongda Ma, Beijing (CN); Yong Qiao, Beijing (CN); Jianbo Xian, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 16/336,653

(22) PCT Filed: Oct. 23, 2018

(86) PCT No.: PCT/CN2018/111432
§ 371 (c)(1),
(2) Date: Mar. 26, 2019

(87) PCT Pub. No.: WO2019/200868
PCT Pub. Date: Oct. 24, 2019

(65) Prior Publication Data
US 2020/0387021 A1  Dec. 10, 2020

(30) Foreign Application Priority Data
Apr. 20, 2018 (CN) .......................... 201820565709.X

(51) Int. Cl.
*G02F 1/1333* (2006.01)
*F21V 8/00* (2006.01)
*G02F 1/13357* (2006.01)

(52) U.S. Cl.
CPC ....... *G02F 1/133308* (2013.01); *G02B 6/009* (2013.01); *G02F 1/133608* (2013.01); *G02F 2001/133322* (2013.01)

(58) Field of Classification Search
CPC ............... G02F 1/133608; G02F 2001/133322
See application file for complete search history.

(56) References Cited

U.S. PATENT DOCUMENTS

2008/0024068 A1* 1/2008 Cho .................. G02F 1/133604
   315/161
2012/0194760 A1* 8/2012 Fukuda ............. G02F 1/133308
   349/58
(Continued)

FOREIGN PATENT DOCUMENTS

CN    102278677 A    12/2011
CN    103453402 A    12/2013
(Continued)

OTHER PUBLICATIONS

International Search Report and Written Opinion for International Appl. No. PCT/CN2018/111432, dated Jan. 22, 2019.

*Primary Examiner* — Evan P Dzierzynski
(74) *Attorney, Agent, or Firm* — The Webb Law Firm

(57) ABSTRACT

The present disclosure provides a backlight module and a display device, and relates to the field of display technology. The backlight module includes a light guide plate, a light source, a frame portion adjacent to a light incident surface of the light guide plate, and one or more positioning members for defining a position of the light source. The at least one positioning member includes a first positioning portion and a second positioning portion. The first positioning portion is located on a surface of the frame portion adjacent to the light incident surface. The second positioning portion is located on the light incident surface. The second positioning portion and the first positioning portion are mutually constrained to restrict relative movement of the light guide plate and the frame portion in a length direction of the light incident surface.

18 Claims, 5 Drawing Sheets

(56) References Cited

U.S. PATENT DOCUMENTS

| | | | |
|---|---|---|---|
| 2014/0240639 A1 | 8/2014 | Jung | |
| 2017/0315408 A1* | 11/2017 | Lee | G02F 1/133611 |
| 2018/0107060 A1* | 4/2018 | Yamakawa | G02F 1/133504 |
| 2019/0258115 A1* | 8/2019 | Kyoukane | G02F 1/133603 |
| 2019/0369324 A1* | 12/2019 | Ma | G02B 6/0088 |

FOREIGN PATENT DOCUMENTS

| | | |
|---|---|---|
| CN | 105527749 A | 4/2016 |
| CN | 205210477 U | 5/2016 |
| CN | 107765479 A | 3/2018 |

\* cited by examiner

BACKLIGHT MODULE AND DISPLAY DEVICE

CROSS-REFERENCE TO RELATED APPLICATIONS

The present application is a U.S. National Stage Application under 35 U. S.C. § 371 of International Patent Application No. PCT/CN2018/111432, filed on Oct. 23, 2018, which claims priority to China Patent Application No. 201820565709.X, filed on Apr. 20, 2018, the disclosure of both of which are incorporated by reference herein in entirety.

TECHNICAL FIELD

The present disclosure relates to the field of display technology, and especially to a backlight module and a display device.

BACKGROUND

In a backlight module, positioning members for limiting a position of a light source which is disposed in a groove between the positioning members is disposed on a frame. The light emitted from the light source enters a light guide plate from a light incident surface of the light guide plate, and exits toward a liquid crystal panel from a light exiting surface of the light guide plate.

SUMMARY

According to one aspect of embodiments of the present disclosure, a backlight module is provided. The backlight module comprises a light guide plate; a light source; a frame portion adjacent to a light incident surface of the light guide plate; and one or more positioning members for defining a position of the light source, wherein at least one of the positioning members comprises: a first positioning portion located on one surface of the frame portion adjacent to the light incident surface, and a second positioning portion located on the light incident surface, wherein the second positioning portion and the first positioning portion are mutually constrained to restrict relative movement of the light guide plate and the frame portion in a length direction of the light incident surface.

In some embodiments, a material of the second positioning portion comprises a transparent material.

In some embodiments, an end of the first positioning portion is mounted to be complementary to an end of the second positioning portion.

In some embodiments, the end of the second positioning portion defines a first concave portion, in which at least a part of the end of the first positioning portion is embedded.

In some embodiments, the end of the first positioning portion defines a first convex portion embedded in the first concave portion.

In some embodiments, the end of the first positioning portion defines a second concave portion and the end of the second positioning portion defines a second convex portion embedded in the second concave portion.

In some embodiments, the first concave portion is an arc-shaped concave portion and the first convex portion is an arc-shaped convex portion.

In some embodiments, the end of the first positioning portion is entirely embedded in the first concave portion.

In some embodiments, the at least one of the positioning members comprises a plurality of positioning members, a length, in a direction from the light incident surface to the frame portion, of a second positioning portion on an intermediate area of the light incident surface is smaller than that of a second positioning portion on an edge area of the light incident surface.

In some embodiments, a length of one of any two adjacent second positioning portions in the plurality of positioning members, which is adjacent to the intermediate area, is smaller than that of the other of the two adjacent second positioning portions, which is away from the intermediate area.

In some embodiments, a length of a first positioning portion on the intermediate area is greater than that of a first positioning portion on the edge area.

In some embodiments, a length of one of any two adjacent first positioning portions in the plurality of positioning members, which is adjacent to the intermediate area, is greater than that of the other of the two adjacent first positioning portions, which is away from the intermediate area.

In some embodiments, a material of the second positioning portion is the same as that of the light guide plate.

In some embodiments, the second positioning portion and the light guide plate are integrally provided.

In some embodiments, a material of the second positioning portion is different from that of the light guide plate.

In some embodiments, the first positioning portion and the frame portion are integrally provided.

According to another aspect of embodiments of the present disclosure, a display device is provided. The display device comprises the backlight module according to any one of above embodiments.

BRIEF DESCRIPTION OF THE DRAWINGS

The accompanying drawings, which constitute part of this specification, illustrate exemplary embodiments of the present disclosure and, together with this specification, serve to explain the principles of the present disclosure.

The present disclosure can be understood more clearly from the following detailed description with reference to the accompanying drawings, in which.

Figure 1:
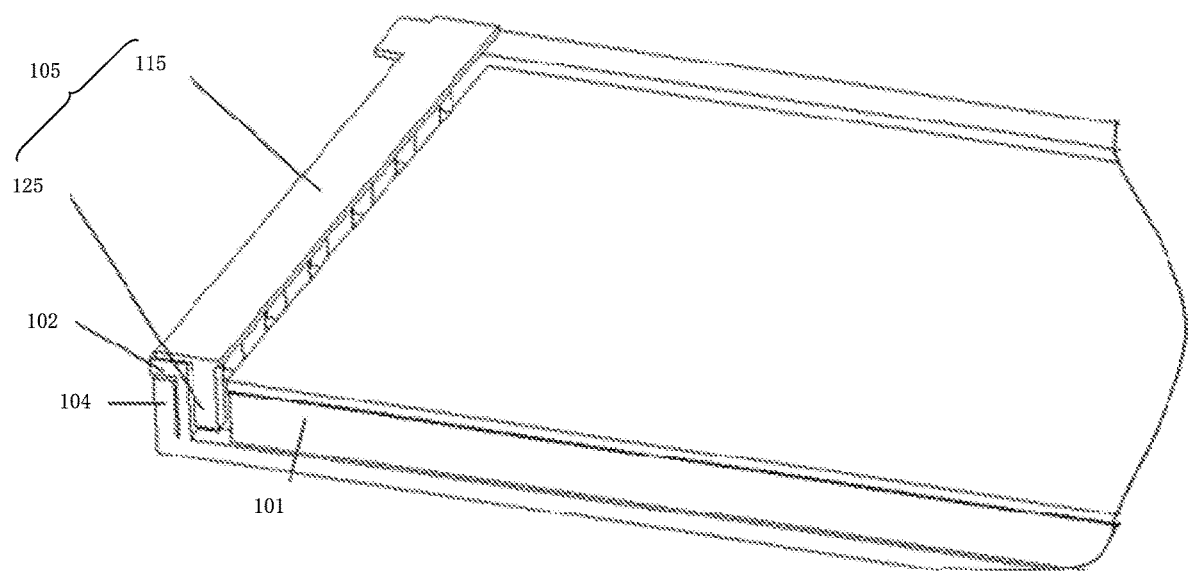
FIG. 1 is a schematic structural view showing a backlight module according to some embodiments of the present disclosure.

It should be understood that the dimensions of the various parts shown in the accompanying drawings are not necessarily drawn according to the actual scale. In addition, the same or similar reference signs are used to denote the same or similar components.

DETAILED DESCRIPTION

Various exemplary embodiments of the present disclosure will now be described in detail with reference to the accompanying drawings. The following description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art.

It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", "have" or variants thereof means that the element before the word covers the element(s) listed after the word without excluding the possibility of also covering other elements. The terms "up", "down", or the like are used only to represent a relative positional relationship, and the relative positional relationship may be changed correspondingly if the absolute position of the described object changes.

In the present disclosure, when it is described that a specific component is disposed between a first component and a second component, there may be an intervening component between the specific component and the first component or between the specific component and the second component. When it is described that a specific part is connected to other parts, the specific part may be directly connected to the other parts without an intervening part, or not directly connected to the other parts with an intervening part.

Unless otherwise defined, all terms (including technical and scientific terms) used herein have the same meanings as the meanings commonly understood by one of ordinary skill in the art to which the present disclosure belongs. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

The inventors have noted that, after a light source is mounted at a position defined by a positioning member, the light source generally corresponds to certain dots on the light guide plate. However, since there is no mutual constraint between the frame and the light incident surface of the light guide plate, a relative movement of the light guide plate and the frame easily occurs in a length direction of the light incident surface, thereby resulting in deviation in the relative positions of the light source and the corresponding dots on the light guide plate, and further affecting the light exiting effect of the light guide plate.

In order to solve the above problem described, the embodiments of the present disclosure provide the following technical solutions.

Figure 2:
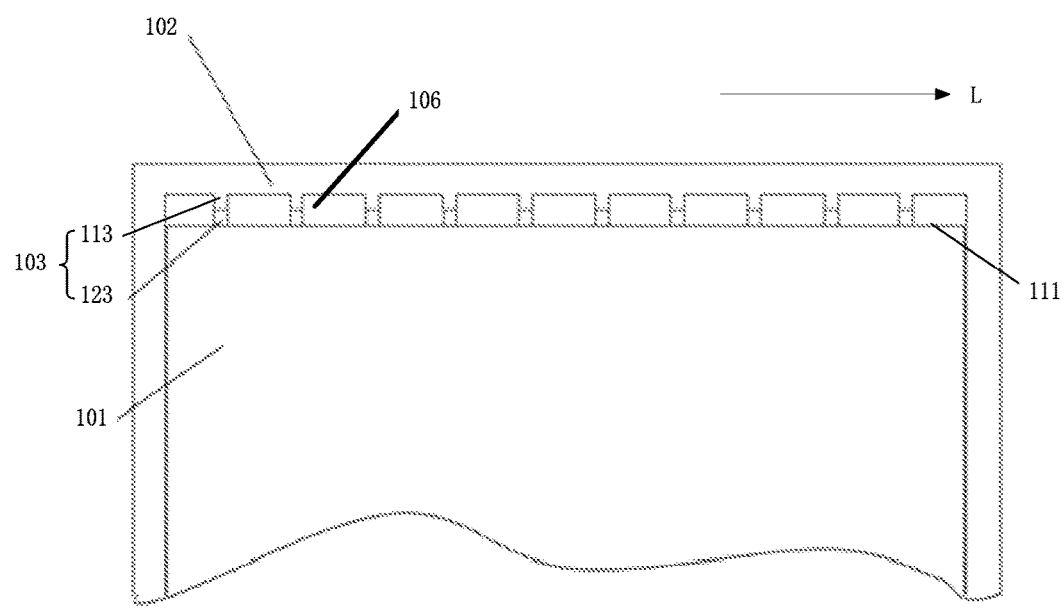
FIG. 2 is a schematic structural view showing a part of the backlight module shown in FIG. 1.
Figure 3:
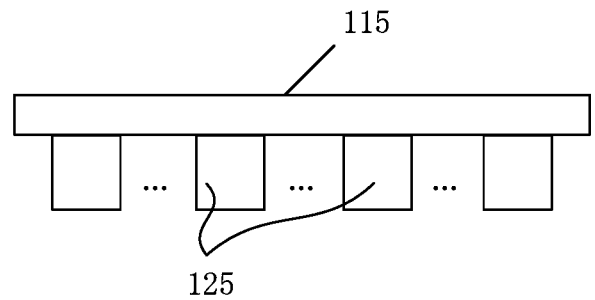
FIG. 3 is a schematic structural view showing the light source in the backlight module shown in FIG. 1.

FIG. 1 is a schematic structural view showing a backlight module according to some embodiments of the present disclosure. FIG. 2 is a schematic structural view showing a part of the backlight module shown in FIG. 1. FIG. 3 is a schematic structural view showing the light source in the backlight module shown in FIG. 1.

The backlight module according to some embodiments of the present disclosure will be introduced below with reference to FIGS. 1-3.

As shown in FIG. 1 and FIG. 2, the backlight module comprises a light guide plate 101, a light source 105, a frame portion 102 adjacent to the light incident surface 111 of the light guide plate 101, and one or more positioning members 103. It should be understood that, the frame portion 102 herein is a portion of the frame of the backlight module that is adjacent to the light incident surface 111 of the light guide plate 101. The frame of the backlight module also comprises other portions connected to the frame portion 102.

The backlight module may also comprise a back plate 104. For example, the back plate 104 may comprise a bottom plate and a side plate connected to the bottom plate. The light guide plate 101 may be located on the bottom plate, and the frame portion 102 may be located on the side plate. The backlight module may also comprise a light source 105. In some embodiments, as shown in FIGS. 1 and 3, the light source 105 may comprise a light source mount frame 115 and a plurality of point light sources 125 mounted on the light source mount frame 115. The light source mounting frame 115 may be connected to the positioning member 103 through a connecting layer (for example, a light reflective adhesive layer). As an example, the light source 105 may comprise an LED (Light Emitting Diode) light bar.

One or more positioning members 103 are used to define the position of the light source 105. As shown in FIG. 2, gaps 106 are defined between adjacent positioning members 103 and between the positioning member 103 and the frame portion 102. The point light sources 125 of the light source 105 may be located in the gaps 106.

At least one positioning member 103 of the one or more positioning members 103 comprises a first positioning portion 113 and a second positioning portion 123 that are oppositely disposed. The first positioning portion 113 is located on one surface of the frame portion 102 adjacent to the light incident surface 111, and the second positioning portion 123 is located on the light incident surface 111. The first positioning portion 113 and the second positioning portion 123 are mutually constrained to restrict relative movement of the light guide plate 101 and the frame portion 102 in the length direction of the light incident surface 111. Here, the light incident surface 111 extends along a direction parallel to the direction indicated by the arrow L. The length direction of the light incident surface 111 may also be understood as the direction the light incident surface 111 extends.

In some embodiments, the first positioning portion 113 and the frame portion 102 may be integrally provided. However, the present disclosure is not limited thereto, and in other embodiments, the first positioning portion 113 may be separately disposed on the frame portion 102.

In the above embodiments, at least one positioning member defining the position of the light source comprises a first positioning portion and a second positioning portion that are mutually constrained. The first positioning portion and the second positioning portion may restrict relative movement of the light guide plate and the frame portion in the length direction of the light incident surface. Such a structure may make the relative positions of the light source and the corresponding dots on the light guide plate not easily deviate, thereby improving the light emitting effect of the light guide plate.

The inventors have also noted that, in a case where the position of the light source is defined by the positioning member on the frame alone, if the positioning member has an excessive length in the direction toward the light incident surface of the light guide plate, a part of the light emitted from the light source cannot enter the light guide plate, and the light guide plate has a lower light incidence efficiency. If the length of the positioning member in the direction toward the light incident surface of the light guide plate is reduced, it is possible to make more light enter the light guide plate and improve the light incidence efficiency of the light guide plate. However, this in turn makes the positioning member not able to favorably restrict the position of the light source, causing the light source easily move. Therefore, it is difficult to balance the requirements of both light incidence efficiency of the light guide plate and the positioning of the light source by defining the position of the light source with the positioning member on the frame alone.

In order to balance the requirements of both light incidence efficiency of the light guide plate and the positioning of the light source, in some embodiments, a material of the second positioning portion 123 may comprise a transparent material. In such a structure, in a case where the length of the first positioning portion 113 is smaller, the position of the light source may still be favorably restricted by the positioning member 103. In addition, since the material of the second positioning portion 123 is a transparent material, the light emitted from the light source 105 can also enter the light guide plate 101 through the second positioning portion 123 without reducing the light incidence efficiency of the light guide plate 101.

In some embodiments, the material of the second positioning portion 123 may be the same as that of the light guide plate 101. In some implementations, the second positioning portion 123 and the light guide plate 101 may be integrally provided. For example, the material of the second positioning portion 123 and the material of the light guide plate 101 may comprise polycarbonate (PC) or polymethyl methacrylate (PMMA). In other embodiments, the material of the second positioning portion 123 may also be different from that of the light guide plate 101.

In a case where the material of the second positioning portion 123 is the same as that of the light guide plate 101, the light entering the second positioning portion 123 can propagate by total reflection, and then enter the light guide plate 101, so that it is possible to make more light enter the light guide plate, thereby further improving the light incidence efficiency of the light guide plate.

The first positioning portion 113 and the second positioning portion 123 may be mounted together in different manners. For example, in some embodiments, the first positioning portion 113 and the second positioning portion 123 may be adhered together. For another example, in other embodiments, an end of the first positioning portion 113 may be mounted to be complementary to an end of the second positioning portion 123. In a case where the second positioning portion 123 comprises a transparent material, the end of the first positioning portion 113 and the end of the second positioning portion 123 that are complementarily mounted may favorably balance the light incidence efficiency of the light guide plate and the positioning of the light source.

Figure 4A:
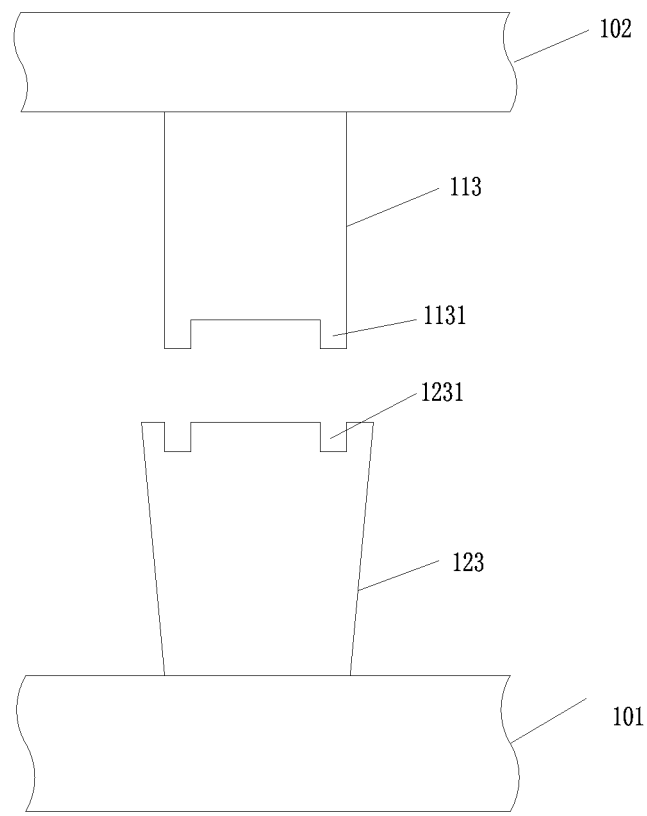
FIG. 4A is a schematic view showing a first positioning portion and a second positioning portion that are complementarily mounted according to some implementations of the present disclosure.
Figure 4B:
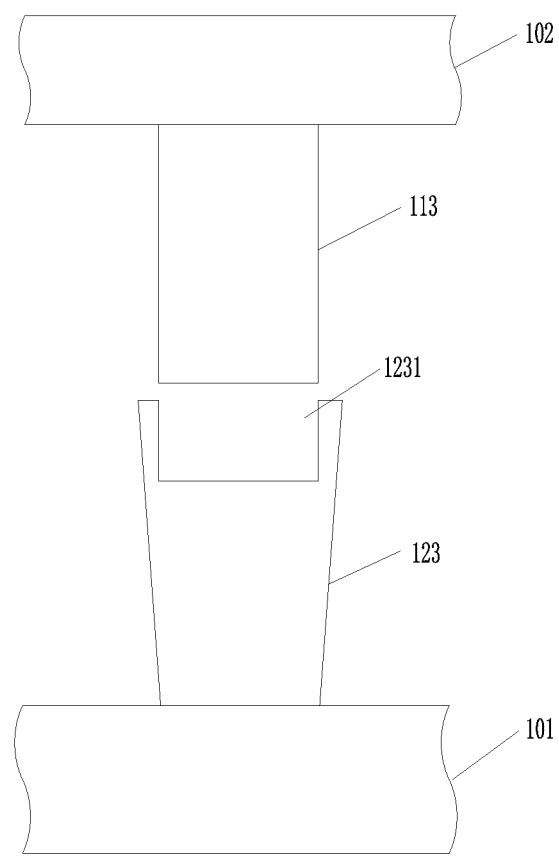
FIG. 4B is a schematic view showing a first positioning portion and a second positioning portion that are complementarily mounted according to other implementations of the present disclosure.
Figure 4C:
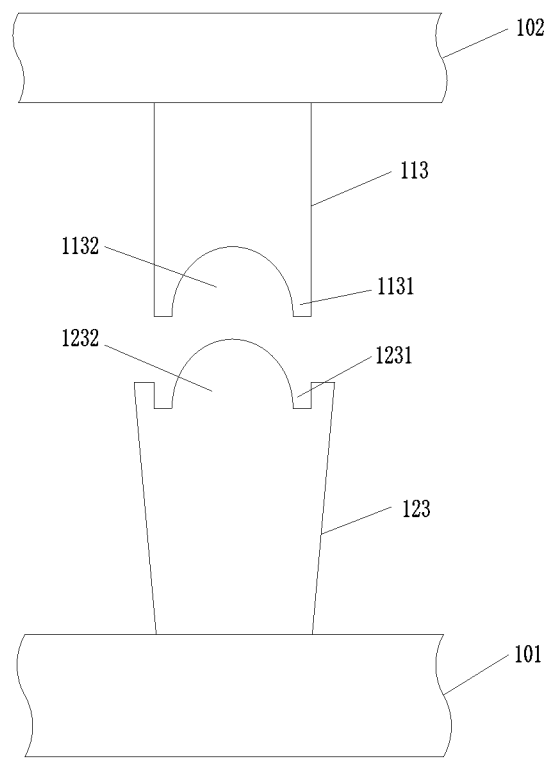
FIG. 4C is a schematic view showing a first positioning portion and a second positioning portion that are complementarily mounted according to still other implementations of the present disclosure.

Implementations in which the first positioning portion 113 and the second positioning portion 123 are complementarily mounted will be introduced below with reference to FIGS. 4A-4C. In FIGS. 4A-4C, the end of the second positioning portion 123 defines a first concave portion 1231, and at least a part of the end of the first positioning portion 113 is embedded in the first concave portion 1231.

It should be noted that, for the sake of illustration, FIGS. 4A-4C only show a pair of first positioning portion 113 and second positioning portion 123 that are oppositely disposed. In addition, in order to show the structures of the first positioning portion 113 and the second positioning portion 123 more clearly, FIGS. 4A to 4C show the separated state of the first positioning portion 113 and the second positioning portion 123, instead of the state in which both of them are mounted together.

FIG. 4A is a schematic view showing a first positioning portion and a second positioning portion that are complementarily mounted according to some implementations of the present disclosure. As shown in FIG. 4A, the end of the second positioning portion 123 defines a first concave portion 1231, and the end of the first positioning portion 113 defines a first convex portion 1131 embedded in the first concave portion 1231. That is to say, a part of the end of the first positioning portion 113 is embedded in the first concave portion 1231. As an example, the first concave portion 1231 may be an arc-shaped concave portion, and the first convex portion 1131 may be an arc-shaped convex portion. However, the present disclosure is not limited thereto.

FIG. 4B is a schematic view showing a first positioning portion and a second positioning portion that are complementarily mounted according to other implementations of the present disclosure. As shown in FIG. 4B, the end of the second positioning portion 123 defines a first concave portion 1231, and the end of the first positioning portion 113 is entirely embedded in the first concave portion 1231. Here, although the first positioning portion 113 and the first concave portion 1231 shown in FIG. 4B are rectangular, this is not intended to limit the present disclosure. For example, in some implementations, the end of the first positioning portion 113 and the first concave portion 1231 may be in other shapes such as an inverted trapezoid.

In the above two implementations, the first positioning portion is partly or entirely embedded in the first concave portion of the second positioning portion, so that not only the first positioning portion and the second positioning portion may be complementarily mounted together, but also more light emitted from the light source may enter the second positioning portion, thereby improving the light incidence efficiency of the light guide plate.

FIG. 4C is a schematic view showing a first positioning portion and a second positioning portion that are complementarily mounted according to still other implementations of the present disclosure. As shown in FIG. 4C, the end of the second positioning portion 123 defines a first concave portion 1231, and the end of the first positioning portion 113 defines a first convex portion 1131 embedded in the first concave portion 1231. In addition, the end of the first positioning portion 113 defines a second concave portion 1132, and the end of the second positioning portion 123 defines a second convex portion 1232 embedded in the second concave portion 1132.

In the above implementation, the first positioning portion and the second positioning portion are mutually embedded, so that they can be bonded stronger, thereby the position of the light source can be better restricted.

Figure 5:
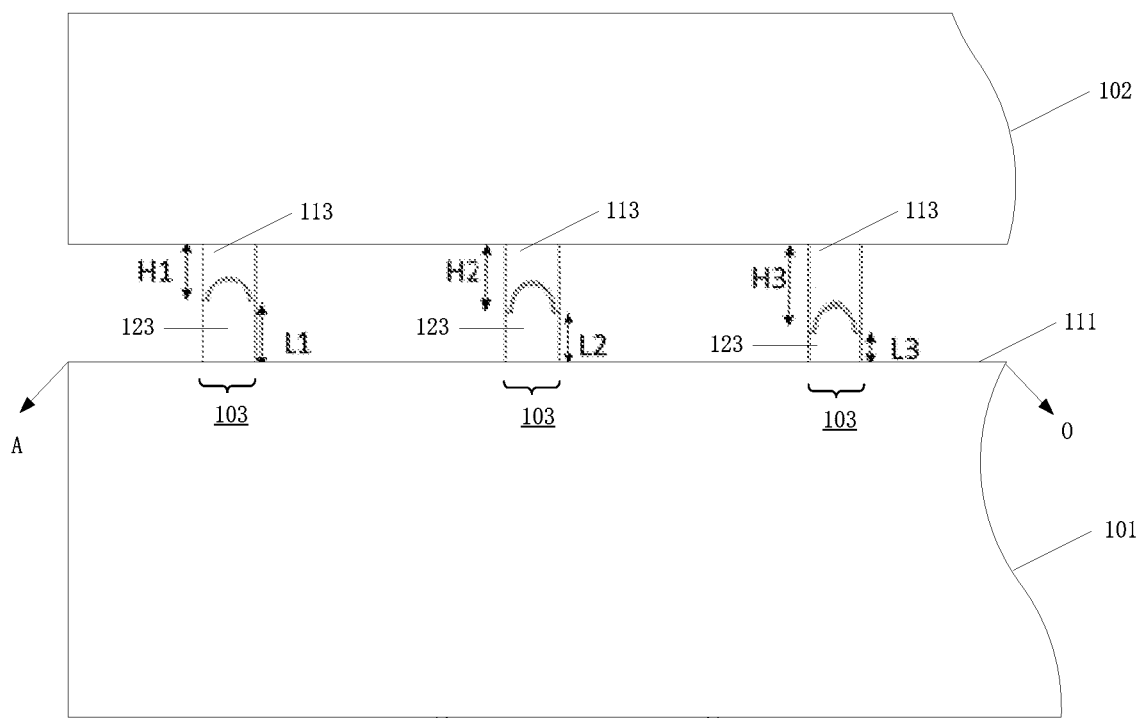
FIG. 5 is a schematic structural view showing a backlight module according to other embodiments of the present disclosure.

FIG. 5 is a schematic structural view showing a backlight module according to other embodiments of the present disclosure.

As shown in FIG. 5, the backlight module comprises a light guide plate 101, a frame portion 102 adjacent to the light incident surface 111 of the light guide plate 101, and a plurality of positioning members 103. Each of the positioning members 103 comprises a first positioning portion 113 and a second positioning portion 123 that are oppositely disposed.

In the following description, the lengths of the second positioning portion 123 and the first positioning portion 113 may be understood as the lengths of the second positioning portion 123 and the first positioning portion 113 extending in the direction from the light incident surface 111 to the frame portion 102, or the lengths extending in the direction from the frame portion 102 to the light incident surface 111.

In FIG. 5, in the arrangement direction of the plurality of positioning members 103, the point A is the edge of the light incident surface 111, and the point O is the midpoint of the light incident surface 111. The length of a second positioning portion 123 on the intermediate area of the light incident surface 111 (i.e., the area adjacent to the point O) is smaller than that of a second positioning portion 123 on the edge area of the light incident surface 111 (i.e., the area adjacent to the point A). For example, the length L3 of the second positioning portion 123 on the area of the light incident surface 111 adjacent to the point O is smaller than the length L1 of the second positioning portion 123 on the area of the light incident surface 111 adjacent to the point A. In some embodiments, the length H3 of the first positioning portion 113 on the intermediate area of the light incident surface 111 is greater than the length H1 of the first positioning portion 113 on the edge area of the light incident surface 111.

It should be understood that the intermediate area and the edge area of the light incident surface 111 are relative concepts. The number of the positioning member 103 on the intermediate area of the light incident surface 111 is not limited to one, and the number of the positioning member 103 on the edge area of the light incident surface 111 is not limited to one. For example, in a case where the intermediate area and the edge area of the light incident surface 111 which each has a plurality of positioning members 103 being disposed, the average value of the lengths of the second positioning portions 123 of the plurality of positioning members 103 on the intermediate area of the light incident surface 111 is smaller than that of the second positioning portions 123 of the plurality of positioning members 103 on the edge area of the light incident surface 111.

In the above embodiment, the length of the second positioning portion on the intermediate area of the light incident surface is smaller than that of the second positioning portion on the edge area of the light incident surface. Therefore, the light entering the intermediate area of the light incident surface via the second positioning portion is less than that entering the edge area of the light incident surface, thereby making the light emitted by the light guide plate more uniform.

In some embodiments, in order to make the light emitted from the light guide plate more uniform, in the second positioning portions 123 of any two adjacent positioning members 103 of the plurality of positioning members 103, the length of the second positioning portion 123 adjacent to the intermediate area is smaller than that of the second positioning portion 123 away from the intermediate area. In other words, the lengths of the second positioning portions 123 in the direction from the intermediate area to the edge area of the light incident surface 111 are sequentially increased. For example, referring to FIG. 5, the lengths of the three second positioning portions 123 on the light incident surface 111 in the direction from the area adjacent to the point O to the area adjacent to the point A are sequentially increased, that is, $L3<L2<L1$. In at least one embodiment, in the first positioning portions 113 of any two adjacent positioning members 103, the length of the first positioning portion 113 adjacent to the intermediate area is greater than that of the first positioning portion 113 away from the intermediate area. That is, the lengths of the first positioning portions 113 in the direction from the intermediate area to the edge area of the light incident surface 111 are sequentially decreased. For example, the lengths of the three first positioning portions 113 on the light incident surface 111 in the direction from the area adjacent to the point O to the area adjacent to the point A are sequentially decreased, that is, $H3>H2>H1$.

Figure 6:
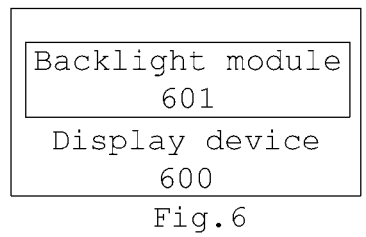
FIG. 6 is a schematic structural view showing a display device according to some embodiments of the present disclosure.

FIG. 6 is a schematic structural view showing a display device according to some embodiments of the present disclosure. As shown in FIG. 6, the display device 600 may comprise the backlight module 601 according to any one of the above embodiments. The display device 600 may be any product or member having a display function, such as a display panel, a mobile terminal, a television, a display, a notebook computer, a digital photo frame, a navigator, or an electronic paper.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features can be made without departing from the scope and spirit of the present disclosure. The scope of the disclosure is defined by the following claims.

What is claimed is:

1. A backlight module, comprising:
   a light guide plate;
   a light source;
   a frame portion adjacent to a light incident surface of the light guide plate; and
   one or more positioning members for defining a position of the light source, wherein at least one of the positioning members comprises:
   a first positioning portion located on one surface of the frame portion adjacent to the light incident surface, and
   a second positioning portion located on the light incident surface, wherein the second positioning portion and the first positioning portion are mutually constrained to restrict relative movement of the light guide plate and the frame portion in a length direction of the light incident surface, wherein the at least one of the positioning members comprises a plurality of positioning members, and a length, in a direction from the light incident surface to the frame portion, of a second positioning portion on an intermediate area of the light incident surface is smaller than that of a second positioning portion on an edge area of the light incident surface.

2. The backlight module according to claim 1, wherein a material of the second positioning portion comprises a transparent material.

3. The backlight module according to claim 2, wherein an end of the first positioning portion is mounted to be complementary to an end of the second positioning portion.

4. The backlight module according to claim 1, wherein an end of the first positioning portion is mounted to be complementary to an end of the second positioning portion.

5. The backlight module according to claim 4, wherein the end of the second positioning portion defines a first concave portion, in which at least a part of the end of the first positioning portion is embedded.

6. The backlight module according to claim 5, wherein the end of the first positioning portion defines a first convex portion embedded in the first concave portion.

7. The backlight module according to claim 6, wherein the end of the first positioning portion defines a second concave portion and the end of the second positioning portion defines a second convex portion embedded in the second concave portion.

8. The backlight module according to claim 6, wherein the first concave portion is an arc-shaped concave portion and the first convex portion is an arc-shaped convex portion.

9. The backlight module according to claim 5, wherein the end of the first positioning portion is entirely embedded in the first concave portion.

10. The backlight module according to claim 1, wherein a length of one of any two adjacent second positioning portions in the plurality of positioning members, which is adjacent to the intermediate area, is smaller than that of the other of the two adjacent second positioning portions, which is away from the intermediate area.

11. The backlight module according to claim 10, wherein a length of a first positioning portion on the intermediate area is greater than that of a first positioning portion on the edge area.

12. The backlight module according to claim 1, wherein a length of a first positioning portion on the intermediate area is greater than that of a first positioning portion on the edge area.

13. The backlight module according to claim 12, wherein a length of one of any two adjacent first positioning portions in the plurality of positioning members, which is adjacent to the intermediate area, is greater than that of the other of the two adjacent first positioning portions, which is away from the intermediate area.

14. The backlight module according to claim 1, wherein a material of the second positioning portion is the same as that of the light guide plate.

15. The backlight module according to claim 14, wherein the second positioning portion and the light guide plate are integrally provided.

16. The backlight module according to claim 1, wherein a material of the second positioning portion is different from that of the light guide plate.

17. The backlight module according to claim 1, wherein the first positioning portion and the frame portion are integrally provided.

18. A display device, comprising the backlight module according to claim 1.

* * * * *